(12) United States Patent
Ceder et al.

(10) Patent No.: US 12,315,928 B2
(45) Date of Patent: May 27, 2025

(54) SOLID-STATE SODIUM ION CONDUCTOR AND METHOD OF MAKING THE SAME

(71) Applicants: Samsung Electronics Co., Ltd., Suwon-Si (KR); The Regents of the University of California, Oakland, CA (US)

(72) Inventors: Gerbrand Ceder, Orinda, CT (US); Jingyang Wang, Berkeley, CA (US); Bin Ouyang, Richmond, CA (US); Yan Wang, Brookline, MA (US); Valentina Lacivita, Cambridge, MA (US)

(73) Assignees: SAMSUNG ELECTRONICS CO., LTD., Gyeonggi-Do (KR); THE REGENT'S OF THE UNIVERSITY OF CALIFORNIA, Oakland, CA (US)

( * ) Notice: Subject to any disclaimer, the term of this patent is extended or adjusted under 35 U.S.C. 154(b) by 612 days.

(21) Appl. No.: 17/592,570

(22) Filed: Feb. 4, 2022

(65) Prior Publication Data
US 2023/0094366 A1    Mar. 30, 2023

Related U.S. Application Data

(60) Provisional application No. 63/248,584, filed on Sep. 27, 2021.

(51) Int. Cl.
*H01M 4/58* (2010.01)
*H01M 4/02* (2006.01)
(Continued)

(52) U.S. Cl.
CPC ....... *H01M 4/5825* (2013.01); *H01M 4/0471* (2013.01); *H01M 4/364* (2013.01);
(Continued)

(58) Field of Classification Search
CPC .. H01M 4/5825; H01M 4/0471; H01M 4/364; H01M 4/485; H01M 4/587; H01M 10/054; H01M 2004/027; H01M 2004/028
See application file for complete search history.

(56) References Cited

U.S. PATENT DOCUMENTS

| | | | |
|---|---|---|---|
| 2010/0068629 A1* | 3/2010 | Gordon | H01M 4/40 429/231.95 |
| 2020/0194826 A1 | 6/2020 | Ikejiri et al. | |

(Continued)

FOREIGN PATENT DOCUMENTS

| | | |
|---|---|---|
| CN | 108695552 B | 10/2018 |
| CN | 108933282 A | 12/2018 |

(Continued)

OTHER PUBLICATIONS

Guin, M., Tietz, F.; "Survey of the transport properties of sodium superionic conductor materials for use in sodium batteries" 2015; J. Power Sources; vol. 273; pp. 1056-1064 (Year: 2015).*

(Continued)

*Primary Examiner* — Brian R Ohara
*Assistant Examiner* — Quintin D. Elliott
(74) *Attorney, Agent, or Firm* — CANTOR COLBURN LLP

(57) ABSTRACT

A solid-state ion conductor includes a compound of the formula $Na_xM^1_{2-(y+z)}M^2_yM^3_z(AO_4)_3$ wherein $M^1$, $M^2$, and $M^3$ are each independently Hf, Mg, Sc, In, Y, Ca, or Zr; A is P, Si, S, or a combination thereof; $3 \leq x \leq 3.5$; $0.5 \leq y \leq 1$; and $0 \leq z \leq 0.5$. The solid-state ion conductor can be useful in various components of an electrochemical cell.

19 Claims, 5 Drawing Sheets

(51) Int. Cl.
  *H01M 4/04* (2006.01)
  *H01M 4/36* (2006.01)
  *H01M 4/485* (2010.01)
  *H01M 4/587* (2010.01)
  *H01M 10/054* (2010.01)

(52) U.S. Cl.
  CPC .......... *H01M 4/485* (2013.01); *H01M 4/587* (2013.01); *H01M 10/054* (2013.01); *H01M 2004/027* (2013.01); *H01M 2004/028* (2013.01)

(56) References Cited

U.S. PATENT DOCUMENTS

2021/0066757 A1* 3/2021 Yamauchi .............. H01M 4/40
2021/0159547 A1 5/2021 Ikejiri et al.

FOREIGN PATENT DOCUMENTS

CN 105470576 B 4/2019
CN 113113593 A 7/2021

OTHER PUBLICATIONS

Chunzhe, Y. Et Al; "Phase relationship and electric behavior of Na3Zr2-xMgxSi2-2xP1+2xO12 system"; 1988; Journal of the Chinese Ceramic Society; vol. 16 pp. 339-344 (Year: 1988).*

Machine Translation of "Phase relationship and electric behavior of Na3Zr2-xMgxSi2-2xP1+2xO12 system" (Year: 1988).*

Lalere, F. Et Al; "An all-solid state NASICON sodium battery operating at 200C"; 2014; J. Power Sources; 2014; vol. 247; pp. 975-980 (Year: 2014).*

Chunzhe et al., "Phase Relationship and Electrical Behaviour of Na3Zr2-xMgxSi2-2xP1+2xO12 System", China Academic Journal Electronic Publishing, English Abstract; 6 pages.

Sundar et al., "Investigation on the applicability of high Na-ion conducting Na3+x[ZrxSc2-x(PO4)3] glass-ceramic electrolyte for use in safer Na-ion batteries", Journal of Physics and Chemistry of Solids, vol. 126, 2013; pp. 209-218.

Cava, R. J. et al., "Effect of Homovalent Framework Cation Substitutions on the Sodium Ion Conductivity in Na3Zr2Si2POI2," Communications of the American Ceramic Society, 1982; pp. C157-C159.

Cherkaoui, F. et al., "Crystal Chemistry and Ionic Conductivity of a New Nasicon-Related Solid Solution," Solid State Ionics, vol. 21, 1986; pp. 333-337.

Fujitsu, S. et al., "Conduction Paths in Sintered Ionic Conductive Material," Mat. Res. Bull., vol. 16, 1981; pp. 1299-1309.

Goodenough, J. B. et al., "Fast Na+—Ion Transport in Skeleton Structures," Mat. res.Bull., vol. 11, 1976; pp. 203-220.

Lu, Y. et al., "A High-Performance Monolithic Solid-State Sodium Battery with Ca2+ Doped Na3Zr2Si2PO12 Electrolyte," Adv. Energy Mater., vol. 9, 2019; 9 pages.

Ma, Q. et al., "Scandium-Substituted Na3Zr2(SiO4)2(PO4) Prepared by a Solution-Assisted Solid-State Reaction Method as Sodium-Ion Conductors," Chemistry of Materials, vol. 28, 2016; pp. 4821-4828.

Saito, Y. et al., "Ionic conductivity of NASICON-type conductors Na1.5M0_5Zr1.5(P04)3 (M: A13+, Ga3+, Cr3+, Sc3+, Fe3+, In3+, Yb3+, Y3+)," Solid State Ionics, vol. 58, 1992; pp. 327-331.

Slater, P. R. et al., "Synthesis and Conductivities of Sulfate/Selenate Phases Related to Nasicon," Journal of Solid State Chemistry, vol. 107, 1993; pp. 12-18.

Takahashi, T. et al., "Solid-State Ionics—Conductivities of Na+ Ion Conductors Based on Nasicon," Solid State Ionics 1, 1980; pp. 163-175.

Winand et al., "Nouvelles Solutions Solides," Journal of Solid State Chemistry, vol. 93, 1991; pp. 341-349.

Yue, Y. et al., "Hydrothermal synthesis and characterization of NaSn2 (PO4)3," Journal of Materials Science Letters, vol. 11, 1992; pp. 148-149.

Zahir, M. et al., "Crystal Chemistry and Ionic Conductivity in Nasicon-Type Phases Na1+xZrZ_xYbx(AsO4)3 WITH 0 < x < 0.45," Materials Letter, vol. 2, No. 3, 1984; pp. 234-236.

* cited by examiner

SOLID-STATE SODIUM ION CONDUCTOR AND METHOD OF MAKING THE SAME

CROSS-REFERENCE TO RELATED APPLICATION

This application claims priority to U.S. provisional Patent Application No. 63/248,584, filed on Sep. 27, 2021, in the United States Patent and Trademark Office, and all the benefits accruing therefrom under 35 U.S.C. § 119, the content of which is incorporated herein in its entirety by reference.

BACKGROUND

(1) Field

Disclosed is a solid-state ion conductor, a component for an electrochemical cell (e.g., a sodium battery) including the solid-state ion conductor, a negative electrode including the solid-state ion conductor, a positive electrode including the solid-state ion conductor, and a method of preparing the solid-state ion conductor.

(2) Description of the Related Art

Solid-state batteries that utilize a solid-state ionic conductor rather than a liquid electrolyte have potential to provide improved safety and energy density. Available solid-state electrolytes have conductivities which are significantly lower than that of liquid electrolytes, limiting their use in practical solid-state batteries.

Accordingly, there is a need in the art for an improved solid-state ionic conductor.

SUMMARY

Disclosed is a solid-state ion conductor comprising a compound of Formula 1:

$$Na_xM^1{}_{2-(y+z)}M^2{}_yM^3{}_z(AO_4)_3 \quad \text{Formula 1}$$

wherein $M^1$, $M^2$ and $M^3$ are each independently Hf, Mg, Sc, In, Y, Ca or Zr; A is P, Si, S, or a combination thereof; $3 \leq x \leq 3.5$; $0.5 \leq y \leq 1$; and $0 \leq z \leq 0.5$.

Also disclosed is a positive electrode comprising a positive active material layer comprising a sodium transition metal oxide, a sodium transition metal phosphate, or a combination thereof; and the solid-state ion conductor on the positive active material layer.

Also disclosed is a negative electrode comprising a negative active material layer comprising carbon, a sodium intercalation compound, sodium metal, a sodium metal alloy, or combination thereof; and the solid-state ion conductor on the negative active material layer.

Also disclosed is a negative electrode for a sodium secondary battery, the electrode comprising: a current collector; and the solid-state ion conductor on the current collector.

Also disclosed is an electrochemical cell comprising: a positive electrode; a negative electrode; and an electrolyte layer between the positive electrode and the negative electrode, wherein at least one of the positive electrode, the negative electrode, or the electrolyte layer comprises the solid-state ion conductor.

Also disclosed is a method of preparing the solid-state ion conductor, the method comprising: contacting a sodium compound, a compound comprising Hf, Mg, Sc, In, Y, Ca, Zr, or a combination thereof, and a compound comprising P, Si, S, or a combination thereof, to provide a mixture; and treating the mixture to provide a compound of Formula 1:

$$Na_xM^1{}_{2-(y+z)}M^2{}_yM^3{}_z(AO_4)_3 \quad \text{Formula 1}$$

wherein $M^1$, $M^2$ and $M^3$ are each independently Hf, Mg, Sc, In, Y, Ca or Zr; A is P, Si, S, or a combination thereof; $3 \leq x \leq 3.5$; $0.5 \leq y \leq 1$; and $0 \leq z \leq 0.5$.

DETAILED DESCRIPTION

Figure 1:
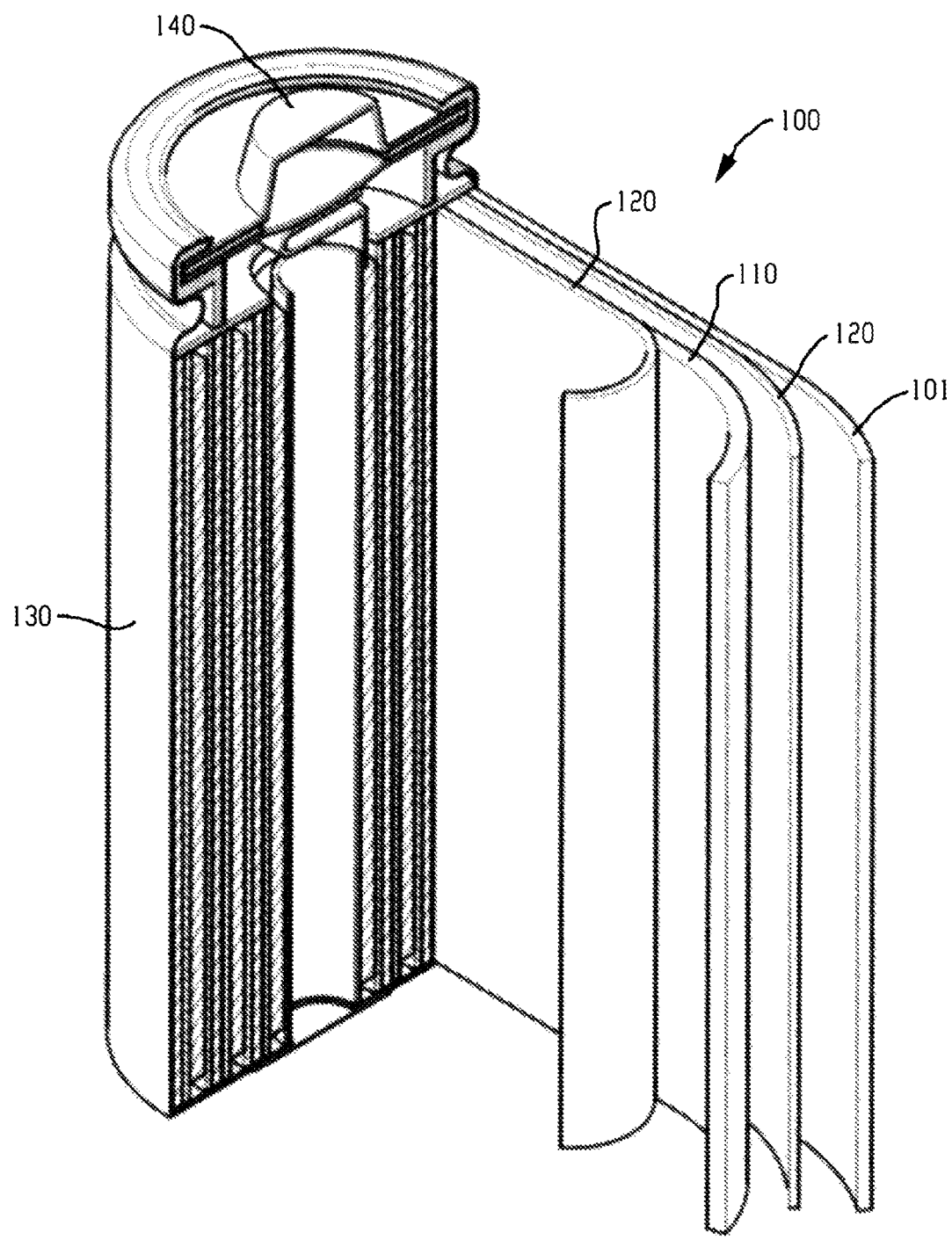
FIG. 1 is a schematic diagram of an embodiment of a sodium battery.

Sodium (Na) Super Ionic Conductor (NASICON) is a class of polyanion materials suitable for applications ranging from gas sensing devices, selective ion membranes, and in particular, rechargeable Na solid-state batteries (Na-SSBs). In a Na-SSB, the liquid electrolyte is replaced with a thin layer of a solid-state electrolyte. The solid electrolyte can sustain the transport of working ions in the solid state, and naturally serves as a separator between cathode and anode. A significant advantage of solid electrolytes over liquid electrolytes is their non-flammability, making SSBs a safer choice, for example, for portable electronic devices and large-scale grid storage. Another advantage is the improved energy density of a solid electrolyte enabled by the usage of an alkali metal anode. Alkali metals possess high specific capacity and low electrode potential, yet their application has been hindered by dendrite formation, which can be potentially addressed in SSBs because of their mechanical robustness and non-flammability. NASICON-type compounds are a class of promising solid-state electrolytes for Na-SSBs which share a general chemical formula Na$_x$M$_2$(AO$_4$)$_3$, where M represents eight coordinated metals and AO$_4$ represents a polyanion group. A three-dimensional tunneled framework is thus constructed by MO$_6$ octahedra and AO$_4$ tetrahedra sharing the corner oxygens, providing a unique fast-ion conducting network for the interstitial Na ions. Despite previous research on NASICON-type compounds, there remains a large unexplored chemical space.

Accordingly, the present inventors have discovered new solid-state ion conductors. The solid-state ion conductors of the present disclosure were found to advantageously have high room temperature ionic conductivity.

In an aspect, disclosed is a solid-state ion conductor comprising a compound of Formula 1:

$$Na_xM^1{}_{2-(y+z)}M^2{}_yM^3{}_z(AO_4)_3 \quad \text{Formula 1}$$

wherein, in Formula 1, $M^1$, $M^2$ and $M^3$ are each independently Hf, Mg, Sc, In, Y, Ca, or Zr; A is P, Si, S, or a combination thereof; $3 \leq x \leq 3.5$; $0.5 \leq y \leq 1$; and $0 \leq z \leq 0.5$. In an aspect, A can be P, Si, or a combination thereof. In an aspect, A can be Si and P. In an aspect, A can be P. In an aspect, $M^1$, $M^2$, and $M^3$ can each independently comprise Hf, Sc, or Zr. In an aspect, $M^1$ comprises Hf, $M^2$ comprises Zr, and when present, $M^3$ comprises Sc. In an aspect, $M^1$ comprises Hf, $M^2$ comprises Zr, and when present, $M^3$ comprises Sc, and A is Si and P. In an aspect, $z=0$. In an aspect, $0<z \leq 0.5$. Within this range, $0.1 \leq z \leq 0.5$, or $0.2 \leq z \leq 0.5$, or $0.3 \leq z \leq 0.5$.

In an aspect, $x=3$. For example, when $x=3$, A can be P, $z=0$, and $M^1$ and $M^2$ can be Hf, Mg, In, Sc or Y, provided that $M^1$ and $M^2$ are different. Exemplary solid-state ion conductors can include $Na_3HfMgP_3O_{12}$, $Na_3ScInP_3O_{12}$, or $Na_3ScYP_3O_{12}$.

In an aspect, when $x=3$, A can be Si and P, $z=0$ and $M^1$ and $M^2$ can be Hf, Mg, Zr, Sc, or Ca, provided that $M^1$ and $M^2$ are different. Exemplary solid-state ion conductors can include $Na_3Hf_{1.5}Mg_{0.5}(SiO_4)(PO_4)_2$, $Na_3Zr_{1.5}Mg_{0.5}(SiO_4)(PO_4)_2$, $Na_3HfSc(SiO_4)(PO_4)_2$, $Na_3Hf_{1.5}Ca_{0.5}(SiO_4)(PO_4)_2$, or $Na_3HfZr(SiO_4)_2(PO_4)$.

In an aspect in Formula 1, $3<x \leq 3.5$. Within this range, $3.1 \leq x \leq 3.5$, or $3.2 \leq x \leq 3.5$, or $3.4 \leq x \leq 3.5$. For example, when $3<x \leq 3.5$, A can be Si and P, $0<z \leq 0.5$, and $M^1$, $M^2$ and $M^3$ can be Hf, Zr, or Sc, provided that $M^1$, $M^2$, and $M^3$ are different. Exemplary solid-state ion conductors can include $Na_{3.4}Hf_{0.6}ZrSc_{0.4}(SiO_4)_2(PO_4)$.

The solid-state ion conductor can have a NASICON structure. As described above, a NASICON structure comprises $MO_6$ octahedra and $AO_4$ tetrahedra sharing the corner oxygens.

X-ray diffraction can be useful in characterizing compounds such as those described herein. For example, in an aspect, the solid-state ion conductor can be of Formula 1 wherein A can comprise Si and P, and the solid-state ion conductor can have a first main peak at a diffraction angle of 17 to 22 degrees 2θ, and a second main peak at a diffraction angle of 30 to 33 degrees 2θ, when analyzed by X-ray powder diffraction using Cu Kα radiation. In an aspect, the solid-state ion conductor can be of Formula 1 wherein A can comprise P, and the solid-state ion conductor can have a first main peak at a diffraction angle of 17 to 22 degrees 2θ, and a second main peak at a diffraction angle of 30 to 33 degrees 2θ, when analyzed by X-ray powder diffraction using Cu Kα radiation.

Advantageously, the solid-state ion conductor of the present disclosure has a high room temperature (e.g., 23° C.) ionic conductivity. Ionic conductivity can be determined by impedance measurement as is generally known in the art. For example, and not by way of limitation, impedance measurements of the solid electrolyte can be performed with a Solartron MTS system. The impedance data can be collected from 1 MHz to 100 Hz with a DC voltage amplitude of 10 mV. To prepare the sample for impedance measurements, approximately 100-200 milligrams of the solid-state ion conductor (as a powder) is pressed into a disk-shaped pellet with the use of a ¼ inch die under a pressure of 1 to 1.2 tons. Blocking electrodes (e.g., indium metal disks) can then be affixed onto both sides of the pellet with a pressure of approximately 0.8 tons. The resulting pellet is assembled into a sealed cell using stainless steel rods as current collectors. Ionic conductivity data can be collected from temperatures ranging from 0 to 100° C. during both the heating and cooling cycles.

The compound according to Formula 1 can have a sodium ion conductivity of $10^{-2}$ to 50 mS/cm, or $10^{-2}$ to 10 mS/cm.

In an aspect, the compound according to Formula 1 can be $Na_3HfZr(SiO_4)_2(PO_4)$ and the ionic conductivity can be greater than $4 \times 10^{-4}$ S/cm, for example $4.2 \times 10^{-4}$ to $4.6 \times 10^{-4}$ S/cm, or $4.3 \times 10^{-4}$ to $4.5 \times 10^{-4}$ S/cm. In an aspect, the compound according to Formula 1 can be $Na_{3.4}Hf_{0.6}Sc_{0.4}Zr(SiO_4)_2(PO_4)$ and the ionic conductivity can be greater than $1 \times 10^{-2}$ S/cm, for example $1.1 \times 10^{-2}$ to $1.5 \times 10^{-2}$ S/cm, or $1.1 \times 10^{-2}$ to $1.2 \times 10^{-2}$ S/cm.

In a specific aspect, the solid-state ion conductor comprises a compound of the formula $Na_3HfZr(SiO_4)_2(PO_4)$. Stated another way, the compound can be of Formula 1, wherein $x=3$, A is Si and P, $z=0$, $y=1$, $M^1$ is Hf and $M^2$ is Zr. The solid-state ion conductor of the formula $Na_3HfZr(SiO_4)_2(PO_4)$ can have a NASICON structure. The solid-state ion conductor of the formula $Na_3HfZr(SiO_4)_2(PO_4)$ can have a first main peak at a diffraction angle of 17 to 22 degrees 2θ, and a second main peak at a diffraction angle of 30 to 33 degrees 2θ, when analyzed by X-ray powder diffraction using Cu Kα radiation. The solid-state ion conductor of the formula $Na_3HfZr(SiO_4)_2(PO_4)$ can have an ionic conductivity of $4.3 \times 10^{-4}$ to $4.5 \times 10^{-4}$ S/cm at 23° C.

In another specific aspect, the solid-state ion conductor comprises a compound of the formula $Na_{3.4}Hf_{0.6}Sc_{0.4}Zr(SiO_4)_2(PO_4)$. Stated another way, the compound can be of Formula 1, wherein $x=3.4$, $y=1$, $z=0.4$, A is Si and P, $M^1$ is Hf, $M^2$ is Zr, and $M^3$ is Sc. The solid-state ion conductor of the formula $Na_{3.4}Hf_{0.6}Sc_{0.4}Zr(SiO_4)_2(PO_4)$ can have a NASICON structure. The solid-state ion conductor of the formula $Na_{3.4}Hf_{0.6}Sc_{0.4}Zr(SiO_4)_2(PO_4)$ can have a first main peak at a diffraction angle of 17 to 22 degrees 2θ, and a second main peak at a diffraction angle of 30 to 33 degrees 2θ, when analyzed by X-ray powder diffraction using Cu Kα radiation. The solid-state ion conductor of the formula $Na_{3.4}Hf_{0.6}Sc_{0.4}Zr(SiO_4)_2(PO_4)$ can have an ionic conductivity of $1.1 \times 10^{-2}$ to $1.2 \times 10^{-2}$ S/cm at 23° C.

It will be understood that other elements can be present within the disclosed compounds either as impurities, additional substituents, or a combination thereof. These other elements do not generally alter the crystal structure of the solid-state ion conductor and its interstitially located charge carriers. Alternatively, these additional elements can form an inert material, or a material that does not substantially affect the overall performance of the surrounding solid-state ion conductor. In either case, it will be understood that the presence of such additional elements is contemplated and should be considered part of the current disclosure.

The solid-state ion conductor can be manufactured using various methods, including by solid state synthesis or by solution-based synthesis, as further described in the Examples below. For example, in an aspect, the solid-state ion conductor can be made by solid-state synthesis method wherein a sodium compound, a compound comprising Hf, Mg, Sc, In, Y, Ca, Zr, or a combination thereof, and a compound comprising P, Si, or a combination thereof can be combined to form a mixture, wherein the combining can comprise high energy mixing, for example, mechanical milling, and can be for a time of 2 to 40 hours and using a rotating speed of 200 to 800 rpm. In an aspect, the rotating speed can be at least 250 rpm (e.g., 250 to 800 rpm). The resulting mixture can be heat-treated to effect crystallization at a temperature of 200 to 1500° C. for a period of time of 2 to 20 hours. In an aspect, the temperature can be up to 1200° C. Preferably, the method can be carried out under inert conditions (e.g., in an atmosphere having oxygen and moisture levels of less than 1 part per million).

Alternatively, the material can be manufactured by a solution-based synthesis wherein a sodium compound, a compound comprising Hf, Mg, Sc, In, Y, Ca, Zr, or a combination thereof, and a compound comprising P, Si, or a combination thereof can be combined in the presence of a solvent, mixed for 12 to 24 hours, and heated to a temperature effective to remove the solvent (e.g., at least 50° C., or at least 65° C., or at least 80° C.). The resulting mixture can be heat-treated to effect crystallization at a temperature of 200 to 1500° C. for a period of time of 2 to 20 hours. Optionally, the mixture can be further heat-treated at a temperature of 200 to 400° C. for a period of time of 2 to 20 hours to further remove residual solvent. Solvents which can be useful for the solution-based synthesis can include, but are not limited to, tetrahydrofuran, acetonitrile, N-methylformamide, ethyl acetate, dimethyl carbonate, dimethoxyethane, diethyleneglycol dimethyl ether, tetraethyleneglycol dimethyl ether, and the like, or a combination thereof. Remaining details of the heat-treating can be determined by one of skill in the art without undue experimentation and are thus not further elaborated upon herein for clarity.

The disclosed method provides a solid-state ion conductor having desirable ionic conductivity and stability against sodium metal. The disclosed method can also provide a cost-effective method of making the solid-state ion conductor. In an aspect, the solid-state ion conductor of Formula 1 does not form an alloy or compound when contacted with sodium metal. Stated another way, the solid-state ion conductor comprising the compound of Formula 1 does not react with sodium metal and the solid-state ion conductor is stable when in contact with sodium metal. In an aspect, in a phase diagram containing sodium metal and the compound of Formula 1, sodium metal and the compound of Formula 1 are directly connected by a tie-line, with no compounds therebetween.

The solid-state ion conductor comprising the compound of Formula 1 can be disposed on a surface of a substrate. The composition comprising the solid-state ion conductor may be disposed on the surface of the substrate using any suitable means, for example, using tape casting, slurry casting, screen printing, or by pressing the solid-state ion conductor on to a surface of a substrate. Additional details of tape casting and screen printing, for example suitable binders and solvents, can be determined by one of skill in the art without undue experimentation. Alternatively, the solid-state ion conductor may be disposed on the substrate by sputtering using a sputtering target comprising the compound of Formula 1. In an aspect, the substrate is a current collector. The current collector may comprise, for example, at least one of nickel, copper, titanium, stainless steel, or amorphous carbon. In an embodiment, the current collector can comprise amorphous carbon. In an aspect, the substrate may be a separator. The separator may comprise, for example, a polymer such as nylon, polyester, polyethylene, polypropylene, poly(tetrafluoroethylene), or polyvinyl chloride, a ceramic such as $TiO_2$ or yttria stabilized zirconia, or a glass such as a borosilicate glass. A combination comprising at least one of the foregoing may be used. Also, the separator may have any suitable form, and may be nonwoven or woven material, or in the form of a film, e.g., a microporous film. Use of microporous polyethylene, microporous polypropylene, or a composite thereof is mentioned. The compound of Formula 1 may be disposed on a surface thereof, e.g., on an exterior surface, or on an interior surface, such as in a pore of the substrate.

The solid-state ion conductor described herein can be incorporated into an electrochemical cell. Disclosed is an electrochemical cell comprising solid-state ion conductor described herein. The electrochemical cell can be fabricated in any suitable shape, can be rectilinear, curvilinear, or a combination thereof, can be prismatic or cylindrical, and can have a wound or stacked configuration. The shape of the electrochemical cell is not limited to the above-mentioned shapes and can have any suitable shape.

The disclosed electrochemical cell comprises a positive electrode, a negative electrode, and an electrolyte layer between the positive electrode and the negative electrode. At least one of the positive electrode, the negative electrode, or the electrolyte layer comprises the solid-state ion conductor disclosed herein. A positive electrode comprising the solid-state ion conductor and a negative electrode comprising the solid-state ion conductor represent additional aspects of the present disclosure. In an aspect, the electrochemical cell can further comprise a separator disposed between the positive electrode and the negative electrode.

The positive electrode can be prepared by forming a positive active material layer including a positive active material on a current collector. The positive active material layer may be prepared using a vapor-state method or a solid-state method. Examples of the vapor-state method include pulsed laser deposition ("PLD"), sputtering deposition, and chemical vapor deposition ("CVD"). However, the vapor state method is not limited thereto, and any suitable vaporization method known in the art may be used. Examples of the solid-state method include a sintering method, a sol-gel method, a doctor-blade method, screen printing, slurry casting, and powder compression. However, the solid-state method is not limited thereto, and any suitable solid-state method may be used.

The positive active material can be any of various suitable materials that are used in sodium-ion batteries. For example, the positive active material can be a compound in which sodium intercalation reversibly occurs, such as an oxide of the formula $NaM^4{}_aO_2$ (e.g., $NaFeO_2$, $NaMnO_2$, $NaNiO_2$, or $NaCoO_2$); or an oxide represented by the formula $NaMn_{1-a}M^4{}_aO_2$, wherein $M^4$ is at least one transition metal element, and $0 \leq a < 1$. Representative positive active materials include $Na[Ni_{1/2}Mn_{1/2}]O_2$, $Na_{2/3}[Fe_{1/2}Mn_{1/2}]O_2$, and the like; an oxide represented by $Na_{0.44}Mn_{1-a}M^4{}_aO_2$, an oxide represented by $Na_{0.7}Mn_{1-a}M^4{}_aO_{2.05}$ (wherein $M^4$ is at least one transition metal element, and $0 \leq a < 1$); an oxide represented by $Na_bM^5{}_cSi_{12}O_{30}$ as $Na_6Fe_2Si_{12}O_{30}$ or $Na_2Fe_5Si_{12}O$ (wherein $M^5$ is at least one transition metal element, $2 \leq b \leq 6$, and $2 \leq c \leq 5$); an oxide represented by $Na_dM^6{}_eSi_6O_{18}$ such as $Na_2Fe_2Si_6O_{18}$ or $Na_2MnFeSi_6O_{18}$ (wherein $M^6$ is at least one transition metal element, $3 \leq d \leq 6$, and $1 \leq e \leq 2$); an oxide represented by $Na_fM^7{}_gSi_2O_6$ such as $Na_2FeSiO_6$ (wherein $M^7$ is at least one element selected from transition metal elements, magnesium (Mg) and aluminum (Al), $1 \leq f \leq 2$, and $1 \leq g \leq 2$); a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$; a fluoride represented by $Na_hM^8F_6$ such as $Na_3FeF_6$ or $Na_2MnF_6$ (wherein $M^8$ is at least one transition metal element, and $2 \leq h \leq 3$), a fluorophosphate such as $Na_3V_2(PO_4)_2F_3$, $Na_3V_2(PO_4)_2FO_2$ and the like. As used herein, "transition metal element" refers to an element of Groups 3 to 11 of the Periodic Table of the Elements. The positive active material is not limited to the foregoing and any suitable positive active material can be used. In an aspect, the positive active material preferably comprises a layered-type oxide cathode material such as $NaMnO_2$, $Na[Ni_{1/2}Mn_{1/2}]O_2$ and $Na_{2/3}[Fe_{1/2}Mn_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$. A combination comprising at least one of the foregoing positive active materials can be used.

In addition, the positive active material layer may further include a conductive agent and a binder. Any suitable conductive agent and binder may be used.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride (PVDF), polyvinyl alcohol (PVA), carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

The positive electrode can further comprise an electrolyte. When present, the electrolyte can comprise one or more salts dissolved in one or more solvents, ionic liquid, gel, ionogel, highly concentrated, or a solid. In an aspect, the electrolyte of the positive electrode can be a solid electrolyte and can comprise a ceramic, glass ceramic, or polymer. The solid electrolyte can be of the same composition as the electrolyte in the separator, or it can be selected to be more electrochemically stable with the positive active material.

In an aspect, a positive electrode comprises a positive active material layer and the solid-state ion conductor of the present disclosure on the positive active material layer. The positive active material layer can comprise any of the aforementioned positive active materials. In an aspect, the positive active material layer comprises a sodium transition metal oxide, a sodium transition metal phosphate, or a combination thereof.

The negative electrode can be produced from a negative active material composition including a negative active material, and optionally, a conductive agent, and a binder. The negative active material that can be used in the electrochemical cell include a negative active material capable of storing and releasing sodium ions electrochemically at a desirable potential, e.g., at ±0.5, ±0.3, or ±0.1 Volts (V) versus $Na/Na^+$. The negative electrode active material can be a known negative electrode active material for a sodium-ion battery such as hard carbon, soft carbon, carbon black, ketjen black, acetylene black, activated carbon, carbon nanotube, carbon fiber, amorphous carbon, or a combination thereof. Also usable are sodium-containing metals and alloys, wherein the metal can be any suitable metal, e.g., Sn, Sb, Ge. Sodium-containing metal oxides, metal nitrides, and metal sulfides are also useful, in particular wherein metal can be Ti, Mo, Sn, Fe, Sb, Co, V. Also useable are phosphorous (P) or metal doped phosphorous (e.g., $NiP_3$). The negative active material is not limited to the foregoing and any suitable negative active material can be used.

In an aspect, the negative electrode comprises a negative active material layer and the solid-state ion conductor of the present disclosure. The negative active material layer can comprise any of the aforementioned negative active materials. In an aspect, the negative active material layer comprises carbon, a sodium intercalation compound, sodium metal, a sodium metal alloy, or combination thereof.

In an aspect, the negative electrode comprises a current collector and the solid-state ion conductor of the present disclosure. The current collector serves to collect electrons by an electrochemical reaction of the active material or to offer electrons required for an electrochemical reaction. The current collector can comprise, for example, copper, nickel, titanium, sintered carbon, stainless steel, or a combination thereof. In an aspect, the current collector can be surface-treated for example, with carbon, nickel, titanium, or silver. In an aspect, the current collector can comprise copper, titanium, stainless steel, or a combination thereof. In an aspect, the current collector can comprise copper or stainless steel that is surface-treated with carbon, nickel, titanium, or silver.

As the separator, when present, a porous olefin film such as polyethylene and polypropylene, and polymer electrolyte can be used. The separator can be porous, and a diameter of a pore of the separator can be in a range of 0.01 to 10 micrometers (μm), and a thickness of the separator can be in a range of 5 to 300 μm. In greater detail, the separator can be a woven or a non-woven fabric comprising an olefin-based polymer such as polypropylene or polyethylene, or a glass fiber.

The electrochemical cell may comprise an electrolyte layer between the positive electrode and the negative electrode.

In an aspect, the positive electrode, the negative electrode, or the electrolyte layer can comprise a liquid electrolyte, e.g., in a pore of the solid-state ion conductor. The liquid electrolyte can include a polar aprotic solvent and a sodium salt. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any suitable solvent can be used.

The sodium salt used as the electrolyte can be, for example, $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$, and the like, or a combination thereof. In an aspect, the liquid electrolyte preferably comprises $NaClO_4$, $NaPF_6$, or a combination thereof. The sodium salt is not limited to the foregoing and any suitable sodium salt can be used. The sodium salt can be present in the electrolyte solution in any suitable concentration, for example 0.1 to 2 molar (M), or 0.5 to 1.5 M.

In an aspect, the battery can be a solid sodium battery, and thus the electrolyte layer comprises a solid electrolyte. For example, the solid-state electrolyte can be an inorganic solid electrolyte, such as an oxide-type (e.g., NASICON or $Na_{1+x}Zr_2Si_xP_{3-x}O_{12}$, $0<x<3$) or a sulfide type (e.g., $Na_3PS_4$); or a polymer electrolyte, such as poly(ethylene oxide)$_8$:$NaAsF_6$. The solid-state electrolyte is not limited thereto, and any suitable solid-state electrolyte can be used in the battery of the present disclosure. In an aspect, the solid electrolyte can serve as a separator to electrically insulate the positive electrode from the negative electrode. In some aspects, other electrolytes, including liquid electrolytes or other solid-state electrolytes can be excluded from the sodium battery of the present disclosure.

In an aspect, the electrolyte layer comprises the solid-state ion conductor of the present disclosure. In an aspect, the electrolyte layer can consist of the solid-state ion conductor of the present disclosure, and other electrolytes, including liquid electrolytes or other solid-state electrolytes can be excluded from the electrolyte layer.

A schematic diagram of a sodium battery is provided in FIG. 1. As shown in the battery 100 of FIG. 1, the negative electrode 101 can be used in combination with a positive electrode 110 and an electrolyte layer 120 can be provided between the positive electrode and the negative electrode. The battery of FIG. 1 can comprise the solid-state ion conductor of the present disclosure. The negative electrode 101, the positive electrode 110, or the electrolyte layer 120 can each independently comprise the compound of Formula 1. Mentioned is use of an electrolyte layer comprising the compound of Formula 1. Also mentioned is use of a negative electrode 101 comprising the compound of Formula 1. Also mentioned is use of a positive electrode 110 comprising the compound of Formula 1.

Figure 2:
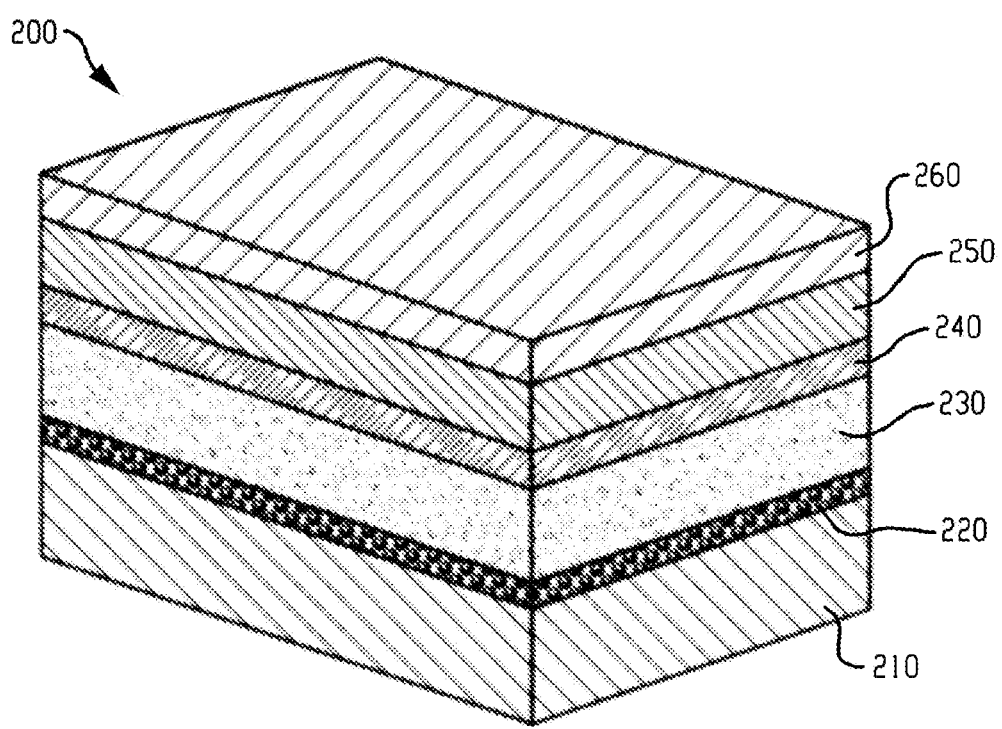
FIG. 2 is a schematic diagram of an embodiment of a sodium battery.

As shown in FIG. 2, a battery 200 may comprise a substrate 230 on a solid-state electrolyte layer 240. The substrate 230 or the solid-state electrolyte layer 240 may each independently comprise the compound according to Formula 1. Also shown in FIG. 2 is a positive electrode current collector 210, a positive electrode 220 comprising the positive electrode active material, a negative electrode 250, and a negative electrode current collector 260. In an aspect, the substrate 230 may be omitted and the solid-state electrolyte layer 240 may be suitable to electrically separate the negative electrode 250 and the positive electrode 220.

The electrochemical cell can be manufactured by providing a positive electrode, providing a negative electrode, and disposing an electrolyte layer between the positive electrode and the negative electrode. The method can optionally further comprise disposing a separator between the positive and the negative electrodes. For example, a sodium battery can be manufactured by sequentially laminating the negative electrode, the solid-state ion conductor comprising the compound according to Formula 1, and the positive electrode; winding or folding the laminated structures, then enclosing the wound or folded structure in a cylindrical or rectangular battery case or pouch to provide the sodium battery.

This disclosure is further illustrated by the following examples, which are non-limiting.

EXAMPLES

Metal oxides or hydroxides ($HfO_2$ (Aldrich, 99.8%), MgO (Aldrich, ≥99.99%), $Sc_2O_3$ (Sigma, 99.9%), $In_2O_3$ (Aldrich, nanopowder, <100 nm, 99.9%), $Y_2O_3$ (Sigma-Aldrich, nanopowder, <50 nm), $Zr(OH)_4$ (Aldrich, 97%), $SnO_2$ (Alfa Aesar, 99.9%), CaO (Sigma-Aldrich, 99.9%)) were used as precursors to introduce metal cations. $SiO_2$ (Sigma-Aldrich, nanopowder) and $NaH_2PO_4$ (Sigma, >99%) were used as silicate and phosphate sources. $Na_2CO_3$ (Sigma-Aldrich, >99%) was used as an extra sodium source. In addition, 10% excess $NaH_2PO_4$ was introduced to compensate for the possible sodium and phosphate loss during the high-temperature treatment.

Stoichiometric amounts of the metal precursor(s) and the silicate or phosphate source were combined to provide a mixture. The mixture was wet ball-milled for 12 hours using a Planetary Ball Mill PM200 (Retsch) to achieve thorough mixing before pressing into pellets. The pelletized samples were annealed at 900-1200° C. under Ar flow, then ground with a mortar and pestle, wet ball-milled, pelletized and re-annealed at 700-1200° C. Detailed temperatures used for the various compounds are listed in Table 1. The crystal structures of the obtained materials were analyzed using X-ray diffraction (Rigaku Miniflex 600 and Bruker D8 Diffractometer) with Cu Kα radiation.

TABLE 1

| Composition | Synthesis condition | Densification condition | Estimated relative density |
| --- | --- | --- | --- |
| $Na_3HfMgP_3O_{12}$ | 900° C., 12 h, Air | 700° C., 16 h, Air | 95.3% |
| $Na_3ScInP_3O_{12}$ | 1000° C., 12 h, Air | 850° C., 16 h, Air | 86.7% |
| $Na_3ScYP_3O_{12}$ | 1200° C., 10 h, Air | 750° C., 48 h, Air | 93.0% |
| $Na_3Hf_{1.5}Mg_{0.5}SiP_2O_{12}$ | 1000° C., 12 h, Air | 1000° C., 16 h, Air | 93.8% |
| $Na_3Zr_{1.5}Mg_{0.5}SiP_2O_{12}$ | 1000° C., 12 h, Air | 1000° C., 16 h, Air | 95.0% |
| $Na_3HfScSiP_2O_{12}$ | 1000° C., 12 h, Ar | 1000° C., 16 h, Ar | 92.5% |
| $Na_3Hf_{1.5}Ca_{0.5}SiP_2O_{12}$ | 1100° C., 10 h, Air | 1000° C., 16 h, Air | 87.0% |
| $Na_3HfZrSi_2PO_{12}$ | 1100° C., 10 h, Ar | 1100° C., 16 h, Ar | 94.9% |
| $Na_{3.4}Hf_{0.6}ZrSc_{0.4}Si_2PO_{12}$ | 1100° C., 10 h, Ar | 1200° C., 10 h, Ar | 95.0% |

The sodium ion conductivity of the compounds of Table 1 was evaluated using electrochemical impedance spectroscopy (EIS) with indium foil as blocking electrodes at temperatures ranging from 0-100° C. Conductor pellets were roughly 1 mm in thickness and 5.6 mm in diameter. EIS measurements were performed using an EC-Lab Electrochemistry VM300, Biologic, at the initial open-circuit voltage in the frequency range of 7 MHz to 100 MHz. The measurements were performed using a Biologic Controlled Environment Sample Holder assembled and sealed in an Ar-filled glovebox. A sodium metal symmetric cell was prepared from a $Na_{3.4}Hf_{0.6}Sc_{0.4}ZrSi_2PO_{12}$ pellet having a thickness of 1.5 mm and a diameter of 5.5 mm as the solid-state conductor as well as separator. Sodium metal was hand-pressed onto each side of the pellet in an Ar-filled glove box. The as-prepared symmetric cell was placed in a customized, sealed solid-state cell with a working pressure of roughly 3 MPa. Galvanostatic cycling was performed using an EC-Lab Electrochemistry VM300, Biologic.

Figure 3:
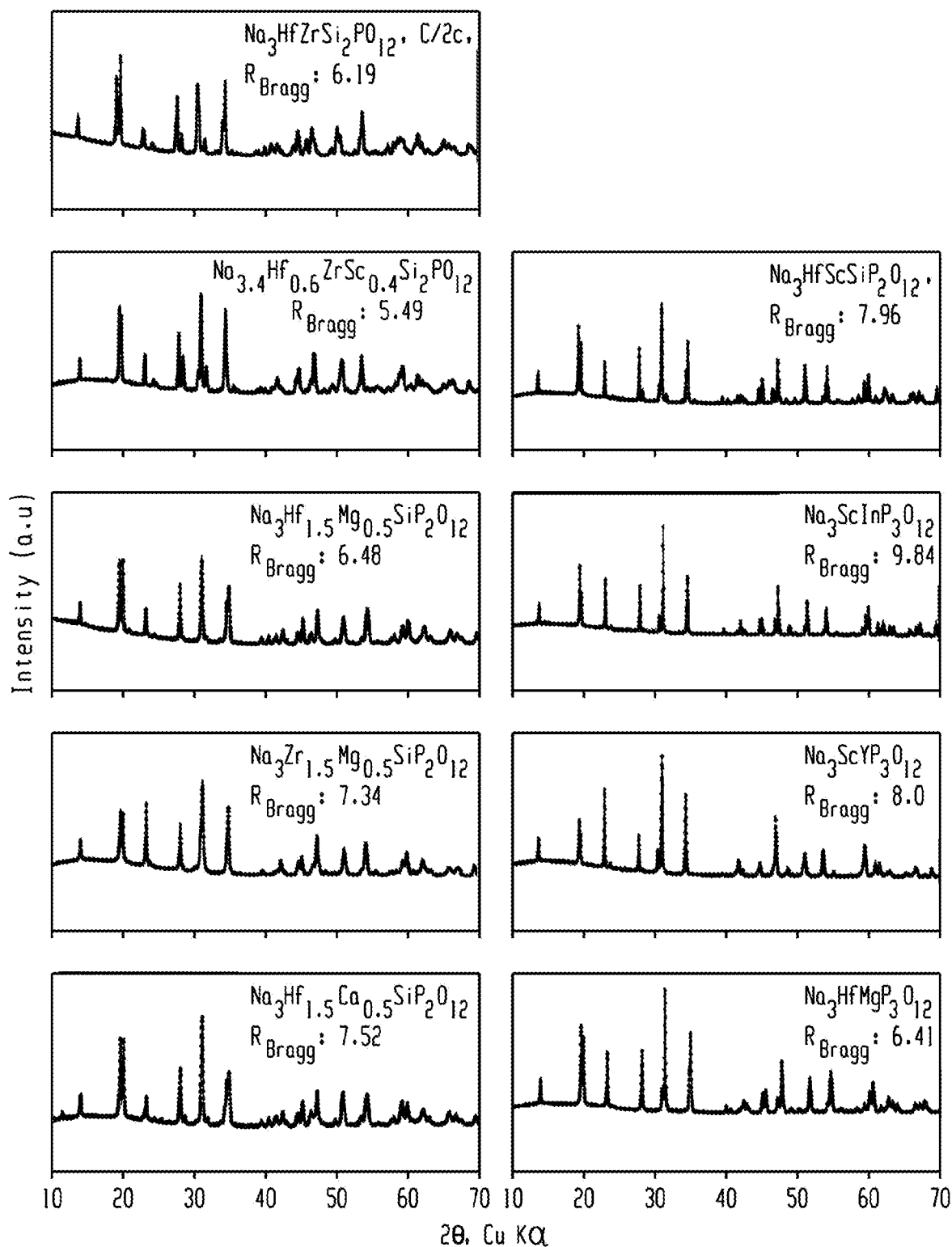
FIG. 3 is a graph of intensity (a.u.) versus diffraction angle (degrees 2 theta (2θ)) showing the results of X-ray diffraction analysis of various as-synthesized materials according to the present disclosure, using Cu $K_\alpha$ radiation.

FIG. 3 shows the X-ray diffraction results of the as-synthesized compounds. $Na_3HfZrSi_2PO_{12}$ has a monoclinic structure (C2/c). The remaining compounds crystallized in a rhombohedral (R–3c) unit cell. All compounds can be properly refined using a Rietveld method, resulting in low $R_{bragg}$ values (<10).

Figure 4:
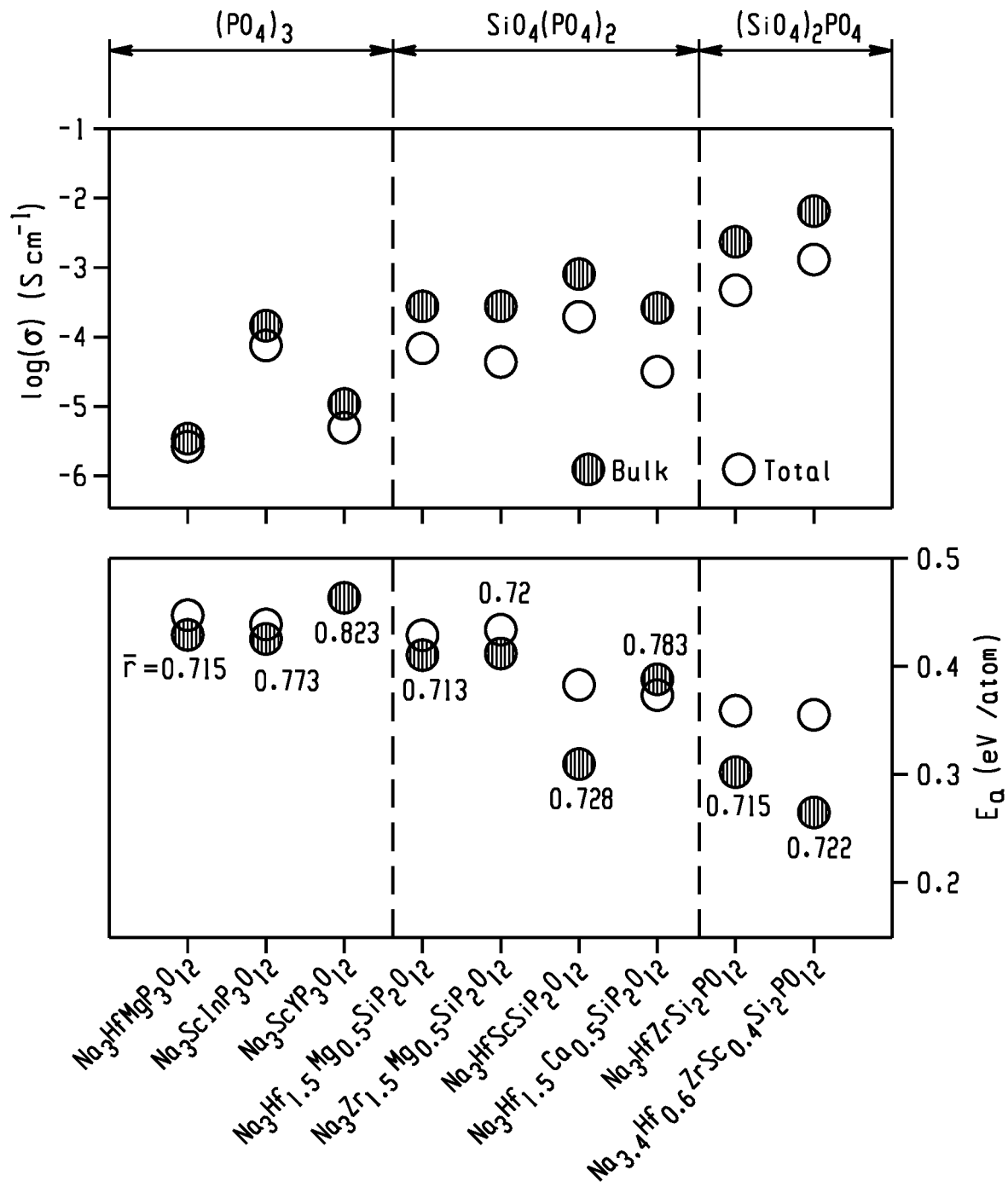
FIG. 4 is a graph of sodium ion conductivity at 300 Kelvin (siemens per centimeter (S/cm), log scale) versus anion type and size for various sodium ion conductors (top), and a graph of activation energy (electron volts per atom) versus anion type and size for various sodium ion conductors (bottom). The average metal radius (r̄) of each compound is provided in the bottom panel.

The ionic conductivity was determined by electrochemical impedance spectroscopy (EIS). Dense conductor pellets (relative density 90%) were first prepared by high-temperature annealing, after which pellets were sandwiched by indium metal as blocking electrodes. The bulk and grain boundary conductivities were extracted through theoretical circuit fitting and summarized in the top panel of FIG. 4. In FIG. 4, compounds are first grouped by their polyanion chemistry, i.e., phosphates $(PO_4)_3$ and two types of mixed silicate-phosphates $((SiO_4)(PO_4)_2$ and $(SiO_4)_2(PO_4))$. In each polyanion group, from left to right the averaged metal radius ($\bar{r}$) are in an ascending order. In general, the ionic conductivity increased as the silicate content increased. Specifically, the total conductivities of the pure phosphate group were in the range of $10^{-6}$ to $10^{-5}$ S cm$^{-1}$, while those of the $(SiO_4)(PO_4)_2$ group were in the range of $10^{-5}$ to $10^{-4}$ S cm$^{-1}$. High ionic conductivities of $4.4 \times 10^{-4}$ and $1.2 \times 10^{-3}$ S cm$^{-1}$ were achieved in $Na_3HfZr(SiO_4)_2(PO_4)$ and $Na_{3.4}Hf_{0.6}Sc_{0.4}Zr(SiO_4)_2(PO_4)$, respectively.

The bottom panel of FIG. 4 shows the activation energies of the synthesized sodium ion conductors, where the bulk contributions are separated from the total ones. Consistent with the trend observed in conductivities, as the silicate content increased, the activation energy generally decreased. Similarly, activation energy also benefitted from the large M site cations, while once the size becomes too large, it starts to increase. $Na_3HfZr(SiO_4)_2(PO_4)$ and $Na_{3.4}Hf_{0.6}Sc_{0.4}Zr(SiO_4)_2(PO_4)$, which have the highest ionic conductivity, also exhibited the lowest bulk activation energies of 0.302 and 0.265 eV, respectively.

Figure 5:
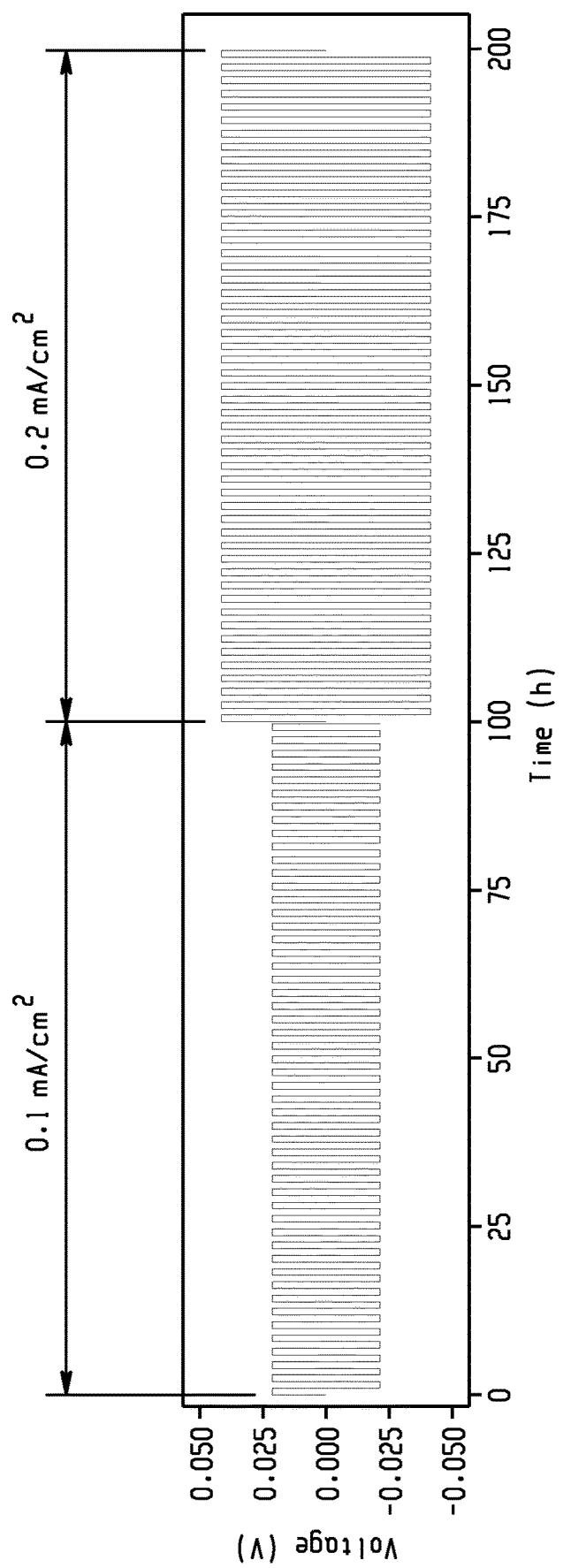
FIG. 5 is a graph of voltage (V) versus time (hours, h) and shows the results of Na stripping and plating tests at current rates of 0.1 mA/cm$^2$ and 0.2 mA/cm$^2$ of a Na|Na$_{3.4}$Hf$_{0.6}$Sc$_{0.4}$Zr(SiO$_4$)$_2$(PO$_4$)|Na symmetric cell.

The stability against sodium metal was evaluated by constructing a $Na|Na_{3.4}Hf_{0.6}Sc_{0.4}ZrSi_2PO_{12}|Na$ symmetric cell, as shown in FIG. 5. Stable Na stripping and plating was achieved for 200 hours at current rates of 0.1 mA/cm and then 0.2 mA/cm. The small overpotentials (<0.025 V for 0.1 mA/cm and <0.05 V for 0.2 mAcm) were observed and stabilized throughout the test, demonstrating that the materials of the present disclosure can be accommodated as solid-state electrolytes for Na batteries.

Other materials properties such as oxidation and reduction stability, chemical stability, thermal stability, mechanical properties, processing cost and device integration are also important evaluations in the context of battery applications. The materials of the present disclosure can achieve a high ionic conductivity of 1.2 mS/cm. Furthermore, good oxidation stability of the polyanion group provides stability with high-voltage cathodes, while the good reduction stability provides stability when in contact with Na metal anodes, as shown in FIG. 3, leading to a wide electrochemical stability window.

Accordingly, replacement of liquid electrolyte with the solid electrolytes of the present disclosure could greatly improve both the energy density and safety of batteries.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross section illustrations that are schematic illustrations of idealized aspects. As such, variations from the shapes of the illustrations as a result, for example, of manufacturing techniques and/or tolerances, are to be expected. Thus, aspects described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

"Group" means a group of the Periodic Table of the Elements according to the International Union of Pure and Applied Chemistry ("IUPAC") Group 1-18 group classification system.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A solid-state ion conductor comprising a compound of Formula 1:

$$Na_xM^1_{2-(y+z)}M^2_yM^3_z(AO_4)_3 \qquad \text{Formula 1}$$

wherein
$M^1$ is Hf or In;
$M^2$ is Zr, Sc, Mg or Ca;
and when present, $M^3$ is Y or Sc;
A is P, Si, S, or a combination thereof;
$3 \le x \le 3.5$;
$0.5 \le y \le 1$; and
$0 \le z \le 0.5$.

2. The solid-state ion conductor of claim 1, wherein $M^1$ comprises Hf, $M^2$ comprises Zr, and when present, $M^3$ comprises Sc.

3. The solid-state ion conductor of claim 1, wherein A is Si and P.

4. The solid-state ion conductor of claim 1, wherein $M^1$ comprises Hf, $M^2$ comprises Zr, and when present, $M^3$ comprises Sc, and A is Si and P.

5. The solid-state ion conductor of claim 1, wherein x is 3.

6. The solid-state ion conductor of claim 1, wherein $3<x\le 3.5$.

7. The solid-state ion conductor of claim 1, wherein x=3, A is P, z=0, $M^1$ is Hf or In and $M^2$ is Sc or Mg.

8. The solid-state ion conductor of claim 7 comprising $Na_3HfMgP_3O_{12}$ or $Na_3ScInP_3O_{12}$.

9. The solid-state ion conductor of claim 1, wherein x=3, A is Si and P, z=0, $M^1$ is Hf or In and $M^2$ is Sc, Mg or Ca.

10. The solid-state ion conductor of claim 9, comprising $Na_3Hf_{1.5}Mg_{0.5}(SiO_4)(PO_4)_2$, $Na_3HfSc(SiO_4)(PO_4)_2$, or $Na_3Hf_{1.5}Ca_{0.5}(SiO_4)(PO_4)_2$.

11. The solid-state ion conductor of claim 1, wherein $3<x\le 3.5$, A is Si and P, and $0<z\le 0.5$, $M^1$ is Hf, $M^2$ is Zr, and $M^3$ is Sc.

12. The solid-state ion conductor of claim 11, comprising $Na_{3.4}Hf_{0.6}ZrSc_{0.4}(SiO_4)_2(PO_4)$.

13. The solid-state ion conductor of claim 1, wherein the compound of Formula 1 has a NASICON structure.

14. The solid-state ion conductor of claim 1, wherein the compound of Formula 1 has a first main diffraction peak at 17 degrees 2θ to 22 degrees 2θ and a second main peak at a diffraction angle of 30 degrees 2θ to 33 degrees 2θ, when analyzed by X-ray powder diffraction using Cu Kα radiation.

15. The solid-state ion conductor of claim 1, wherein the compound of Formula 1 has a sodium ion conductivity of $10^{-2}$ to 50 mS/cm, or $10^{-2}$ to 10 mS/cm.

16. A positive electrode comprising
a positive active material layer comprising a sodium transition metal oxide, a sodium transition metal phosphate, or a combination thereof; and
the solid-state ion conductor of claim 1 on the positive active material layer.

17. A negative electrode comprising
a negative active material layer comprising carbon, a sodium intercalation compound, sodium metal, a sodium metal alloy, or combination thereof; and
the solid-state ion conductor of claim 1 on the negative active material layer.

18. A negative electrode for a sodium secondary battery, the electrode comprising:
a current collector; and
the solid-state ion conductor of claim 1 on the current collector.

19. An electrochemical cell comprising:
a positive electrode;
a negative electrode; and
an electrolyte layer between the positive electrode and the negative electrode,
wherein at least one of the positive electrode, the negative electrode, or the electrolyte layer comprises the solid-state ion conductor of claim 1.

* * * * *